United States Patent
Woodward (10) Patent No.: US 8,131,538 B2
(45) Date of Patent: Mar. 6, 2012

(54) PHONEME DECODING SYSTEM AND METHOD

(75) Inventor: Robert Woodward, Harleysville, PA (US)

(73) Assignee: American Youth Literacy Foundation, Collegeville, PA (US)

( * ) Notice: Subject to any disclaimer, the term of this patent is extended or adjusted under 35 U.S.C. 154(b) by 967 days.

(21) Appl. No.: 10/955,101

(22) Filed: Sep. 30, 2004

(65) Prior Publication Data

US 2005/0102143 A1    May 12, 2005

Related U.S. Application Data (60) Provisional application No. 60/507,173, filed on Sep. 30, 2003, provisional application No. 60/510,732, filed on Oct. 11, 2003.

(51) Int. Cl.
*G06F 17/27*      (2006.01)

(52) U.S. Cl. .............. 704/9; 704/1; 704/6; 704/7; 704/8

(58) Field of Classification Search .................. None
See application file for complete search history.

(56) References Cited

U.S. PATENT DOCUMENTS

| | | | | |
|---|---|---|---|---|
| 4,655,713 A * | 4/1987 | Weiss | ............. | 434/178 |
| 4,696,492 A * | 9/1987 | Hardin | ............. | 283/45 |
| 4,713,008 A * | 12/1987 | Stocker et al. | ............. | 434/167 |
| 5,451,163 A * | 9/1995 | Black | ............. | 434/178 |
| 6,077,080 A * | 6/2000 | Rai | ............. | 434/170 |
| 6,491,524 B2 * | 12/2002 | Bender | ............. | 434/159 |
| 6,685,477 B1 * | 2/2004 | Goldman et al. | ............. | 434/172 |
| 2002/0094511 A1 * | 7/2002 | Li | ............. | 434/167 |
| 2003/0074182 A1 * | 4/2003 | Mathias | ............. | 704/1 |
| 2005/0069848 A1 * | 3/2005 | Cytanovich | ............. | 434/178 |
| 2006/0110713 A1 * | 5/2006 | Guffanti | ............. | 434/167 |

* cited by examiner

*Primary Examiner* — Leonard Saint Cyr
(74) *Attorney, Agent, or Firm* — Duane Morris LLP (57) ABSTRACT

The invention disclosed herein relates generally to a phoneme communication system. More specifically, the invention relates to a phoneme communication system utilizing entertaining phoneme symbols that have a one-to-one correspondence with a phoneme. The invention also relates to phonetic patch for correcting already existing orthographic codifications of English phonemes and other phonemes.

18 Claims, 6 Drawing Sheets

150a

110 → Once there was a fat cat named Bart. Bart was
120

110 → brown. He lived in a can in the junk yard. He
120

110 → was a nice cat. Bart had three friends: Bill,
120

110 → Hope and Joy. One day Bart caught a mouse.
120 120 120 120

110 → He let the mouse go. Bart was a nice cat. He

150b

110 → liked mice. In fact, he had a mouse friend

110 → named Sam. One day Bart, Bill, Hope and Joy

110 → went for a walk in the park. Sam came too. He
120 120

110 → rode on Bart's head.
120

FIGURE 1A

| | | | |
|---|---|---|---|
| tō | lĕtter | fĕlt | grieve |
| sēe | thĕn | chĭn | abuse |
| căt | hĭmself —130 | trāy | rĕsidence |
| mĭlk | hōw | ăpprōve | quărantine |
| rĕd | dēep | clĭff | cŏntagious |
| trēe | spĕll | stălk | glŭtton |
| bĭg | bĕtween | splĭt | exhăust |
| bŏok | weăther | hūge | ĭmplȳ |
| wăs | lĭp | plŏt | ĭmage —140 |
| cĭty | blŏck | quălity | cŏntemporary |
| ēat | awāke | escape | theory |
| hĭm | sīze | ūrge | thrĕshold |

FIGURE 1B brëak ~120a brëad ~120a rëad ~120a hëart ~120a

FIGURE 2

Long Vowel Sounds

— A —
a ey ay eigh et ea au

— E —
e ey ea ee ei ie y

— I —
ie i y eye aye igh uy ye

— O —
o oa ow ou ew ough aux

— U —
u eu ue ew eau

Short Vowel Sounds, Vowel Digraphs and Diphthongs a au | e ea ai ie | a e i iou ou ui y | o a | a e o ou u a au augh aw o ou ough | eigh i igh | eu ew o oo ou u ue ui oo ou u | oi oy | ao au ow ou

"L," "M," "N," and "R" Controlled Vowels

310 — all ale ey'll | al el le ol ool ul ull | a'am am amn | an aun | ar are air are ear eir ere | er ere ir ur ure urr yrrh | ar oar oor or ore our ure

Multi-Source Consonant Sounds

C: c k | F: f ph gh | H: h j | J: dge g ge j | K: c ch ck k qu | Qu: cho qu | S: c ce s sc ——— 310

V: f v | W: u w | X: cks x | Y: i y | Z: s z

Single Source Consonant Sounds b d g l m n p r t

Digraphs, Constructions and Other Symbols ch cz t | th | th | ch s sh | o wa wha wo | g s si z sian sion ssion | cean shin' ssian ssion tion | silent | syllable divider | accent mark

Long Vowel Sounds

| A | E | I | O | U |
|---|---|---|---|---|
| "A" like play<br>they, prey | "E" like tree<br>pea, key | "I" like pie<br>my, try, eye, sigh | "O" like boat<br>rope, sew, faux | "U" like universe<br>cute, Utah, few |

Short Vowel Sounds, Vowel Digraphs and Diphthongs

| | | | | |
|---|---|---|---|---|
| "a" like hat<br>sat, cat, bat | "e" like bell<br>said, lead, again | "i" like pill<br>his, fig, igloo | "o" like dot<br>spot, latte, mama | "u" like sun<br>the, some, was |
| "aw" like paw<br>ball, art, on | "uy" like kite<br>light, knight, site | "oo" like spoon<br>dune, to | "oo" like book<br>could, pudding | "oi" like joy<br>boy, point | "ow" like mouse<br>cow, plow |

"L," "M," "N," and "R" Controlled Vowels

| | | | 310 |
|---|---|---|---|
| "all" like pale<br>sall, whale | "ul" like triangle<br>travel, giggle | "am" like ram<br>jam, hamburger | "an" like man<br>hand, aunt |
| "ar" like star<br>car, are | "air" like arrow<br>bear, dare, where | "er" like bird<br>fir, fur, per, were | "or" like four<br>poor, sore, boar |

Multi-Source Consonant Sounds

| C | F | H | J | K | Qu |
|---|---|---|---|---|---|
| "c" like cat<br>kit, cup | "f" like fast<br>phone | "h" like hope<br>San Jose | "j" like jump<br>gentle, lodge | "k" like kitten<br>unique, school | "qu" like queen<br>choir |
| S | V | W | X | Y | Z |
| "s" like sound<br>prince, center | "v" like oven,<br>of, Stephen | "w" like watch<br>guava, suave | "x" like box<br>blocks | "y" like yarn<br>petunia, Julia | "z" like zoo<br>boys, noise, was |

Single Source Consonant Sounds

| b | d | g | l | m | n | p | r | t |
|---|---|---|---|---|---|---|---|---|

Digraphs, Constructions and Other Symbols

| | Ŧł | 3 | | | z | |
|---|---|---|---|---|---|---|
| "ch" like check<br>picture, Czech | "th" like this<br>that | "th" like math<br>bath | "sh" like ship<br>Charlotte, chartreuse | "wu" like was<br>one, once | "zh" like azure,<br>mirage, measure | "zhn" like vision<br>persuasion |
| 310 | "shnn" like ocean<br>potion, station | ⌀<br>silent | \|<br>syllable divider | /<br>accent mark | | |

Long Vowel Sounds

| A | E | I | O | U |
|---|---|---|---|---|
| Bake | Pete | Pie | So | Universe |
| They | Key | Hi | Boat | Feud |
| Hay | Heat | High | Mow | Cue |
| Eight | Tree | Why | Boulder | Pew |
| Fillet | Weird | Buy | Sew | Beautiful |
| Break | Thief | Eye | Bough | |
| Gauge | Bunny | Lye | Faux | |

Short Vowel Sounds, Vowel Digraphs and Diphthongs

| Hat | Bell | Quarantine | Hot | Was |
|---|---|---|---|---|
| Laugh | Bread | Wanted | Latte | The |
| | Said | It | | Some |
| | Friend | Delicious | | Touch |
| | | Jealous | | Puff |

| Ball | Height | Deuce | Book | Point | Tao |
|---|---|---|---|---|---|
| Taut | Kite | Dew | Could | Toy | Faust |
| Caught | Light | Do | Pull | | Cow |
| Paw | | Too | | 310 | Shout |
| Dog | | Soup | Gym | | |
| Cough | | Dune | Build | | |
| Bought | | Blue | | | |
| | | Suit | | | |

"L," "M," "N," and "R" Controlled Vowels

| Sall | Capital | | Ram | Man |
|---|---|---|---|---|
| Pale | Travel | | | Aunt |
| They'll | Triangle | 310 | | |
| | Capitol | | | |
| | Wool | Air | Per | War |
| Star | Fulton | Bare | Were | Oar |
| Are | Pull | Bear | Fir | Moor |
| | | Heir | Fur | 4 Or |
| | | Where | Insure | Ore |
| | | Guarantee | Purr | Four |
| | | | Myrrh | Sure |

Multi-Source Consonant Sounds

| C | F | H | J | K | Qu |
|---|---|---|---|---|---|
| Cup | Fox | Hot | Dodge | Cup | Choir |
| Kite | Phone | San Jose | Ginger | School | Queen |
| | Cough | | Age | Duck | |
| | | | Jam | Kite | |
| | | | | Unique | |

| S | V | W | X | Y | Z |
|---|---|---|---|---|---|
| Cent | Of | Wash | Blocks | 310 Petunia | Was |
| Dance | Vent | Guava | Box | Yarn | Zebra |
| Sent | | | | | |
| Scent | | | | | |

Single Source Consonant Sounds b  d  g  l  m  n  p  r  t

Digraphs, Constructions and Other Symbols

| ✓ | Ħ | 3 | ⛴ | ℈ | ℥ | 👁 |
|---|---|---|---|---|---|---|
| check | This | Three | Ship | One | Mirage | Asian |
| Czech | | | Charlotte | Iowa | Treasure | Vision |
| Picture | | | | what | Asia | Fission |
| | | | | wonder | Azure | |

| | Ocean | ∅ Lamb | Hymn |
|---|---|---|---|
| | Fishin' | Acquire | Coup |
| | Russian | Bake | Corps |
| | Passion | Gnat | Two |
| | Motion | Herb | |
| | | Know | |
| | | Walk | |

PHONEME DECODING SYSTEM AND METHOD

RELATED APPLICATIONS

This application claims the benefit under 35 U.S.C. §119 of provisional patent application No. 60/507,173 filed Sep. 30, 2003 and provisional patent application No. 60/510,732 filed Oct. 11, 2003, which are hereby incorporated by reference in their entirety.

BACKGROUND OF THE INVENTION

The invention disclosed herein relates generally to a phoneme communication system. More specifically, the invention relates to a phoneme communication system utilizing entertaining phoneme symbols that have a one-to-one correspondence with a phoneme. The invention also relates to phonetic patch for correcting already existing orthographic codifications of English phonemes and other phonemes.

Learning to read the English language is considered a very difficult challenge, whether for children, "English as a Second Language" (ESL) students, ambassadors and other politicians, or others. This is due primarily to the complexity of the written English language attributable to the language's roots in several other tongues. The English alphabet only has twenty-six letters, however the English language contains more than twenty-six phonemes. As a result of this discrepancy, many letters or strings of letters represent one or more phonemes dependent upon usage. This gives rise to great difficulty in the phonetic decoding of individual words. Unlike Spanish and other more truly phonetic languages, English words are often not spelled as they sound. From the point of view of one learning the language, for example, standard letter string representations of actual human-pronounceable sounds (phonemes) are misleading.

Prior attempts were made to minimize these difficulties. For example, U.S. Pat. No. 4,007,548 ("Cytanovich") discusses a method of teaching reading by presenting words in an orthography consisting of standard type having letters associated with each sound sequentially in a syllable and symbols to indicate each of the vowel sounds. Also, U.S. Pat. No. 6,604,947 ("Rai") discusses an education method for aiding to teach and learn reading, writing and spelling. The method employs both colors and symbols. However, the prior art is deficient in many respects, including in its ability to effectively and comprehensively delineate syllables, delineate emphasis, and communicate silent phonemes, consonant phonemes, and communicate other phonemes, such as diphthong and construction phonemes, for example. Furthermore, the prior art could not be used as to phonetic patch for correcting already existing phoneme codifications (e.g. existing phoneme spellings).

Interestingly, ancient languages such as Hebrew and Arabic, recognizing the difficulty, utilized reading marks to assist with phonetic interpretation. Reading marks in languages such as Hebrew and Arabic are generally considered in two classes, vowels and diacritics. Ancient phonetic languages such as Hebrew and Arabic were written without many of the spoken vowels. After many centuries, scholars and scribes began the practice of adding vowels to supplement the consonants. This was done in the manner of superscripted and subscripted vowels above and below the consonants, thereby effectively circumventing the need to rearrange the written root characters of the word. However these reading marks did not communicate any information to the reader as to how the underlying root letter should be pronounced when positioned in varying contexts. Unlike English, these languages were primary tongues. One of the difficulties arises in English, as a result of the fact that it is a heterogeneous language, built upon the word and spellings of words from other languages.

A second class of reading marks known as diacritics also accompanies written Arabic and Hebrew text. These marks are non-unique marks that can be associated with one of several letters and indicate to the reader how much and what type of verbal emphasis should be applied to a given letter. Diacritic marks require the reader to conjugate a sound by reading the mark in conjunction with the underlying alphabetic character.

SUMMARY OF THE INVENTION

The present invention does not require conjugation. Preferred embodiments utilize superscripted marks to communicate information to the reader as to how the underling letter string should be pronounced. In addition to solving the problem of conjugation, the present invention providing the improvement of a comprehensive orthographic patch, that comprehensively codifies existing English-language phonemes (or more). The patch, being comprised of phoneme symbols, can be positioned with existing text so as to decode the letter string phonemes. When Noah Webster created the groundwork for the modern English orthography, he did not utilize a one-to-one correspondence between letters/characters and phonemes. The present invention, in some embodiments, is a patch that bridges the gap between phonemes and letter strings of varying and length and usages. By utilizing these patches, readers that are both fluent and non-fluent in the text, can read the text passages.

Embodiments of the phonetics system communicate the proper sounding of new and novel words to children, ESL students, disabled readers, foreign readers and experienced readers and can be regionalized to effectively communicate the phonetics of a dialect, regional or otherwise. Actors and other professionals can quickly, and efficiently learn a dialect, for example. The system does not distort the spelling of a word, and is a comprehensive sounding aid flexible to expand when new words and phonemes are added.

The number of phonemes in the English language is a subject of academic debate. The present invention contemplates the use of any number of phonemes, so long as there is a one-to-one correspondence between a phoneme and a symbol type that is representative of that phoneme. In the preferred embodiment, there are fifty-three English-language phonemes plus a silent phoneme. The silent phoneme is used to indicate a silent letter string and is properly codified as a null sign. In some embodiments, there are a lower or greater number of phonemes.

Phonemes (human pronounceable sounds) are codified into symbol types with a bilateral one-to-one correspondence and represented by phoneme symbols and the inventory of phoneme symbols is flexible to expand when new phonemes are contemplated. When the phoneme symbols are aligned or otherwise disposed proximate to a letter string in a word, for placing a superscripted phoneme symbol above a letter string, the phonetic phoneme symbol indicates the identity of the phoneme underlying the letter string in accordance with the given usage. As discussed herein, a "silent phoneme" is defined as a lack of pronounced sound or a break in pronounced sound. For example, the "e" in the word "brake" is a silent sound. As another non-limiting example, the "l" in the word "walk" is a silent sound. The preferred symbol type for a silent phoneme is the null sign, however any suitable symbol may be used.

The present invention utilizes a one-to-one correspondence between symbol types and phonemes. An instance of the symbol type is referred to herein as a phoneme symbol. For example, a passage may show multiple instances of the symbol type "E" (a.k.a. multiple phoneme symbols) in a given passage. For example, in sentence "I saw a tree in the city," there would be a phoneme symbol "E" above the "ee" in "tree" and above the "y" in the word "city". Only one phoneme is associated with a particular symbol type and only that particular symbol type is associated with the phoneme. Multiple phonemes and symbol types can be associated with a particular letter string. However, the symbol key allows the decoding of these letter strings and associates each letter string with a corresponding phoneme, and in most cases, associated the letter string with a phoneme symbol.

Preferred embodiments of the present invention comprise a phoneme communication method for aiding to teach and learn proper English reading, sounding and spelling, wherein students and readers can visualize, at a glance, which letter strings are to be sounded as written and which are to be sounded in accordance with a sound represented by a phoneme symbol located proximate to the letter strings. Some embodiments of the present invention provide a method of phonetic reading which is applicable on any visual media that can be displayed, projected, printed, etc.

Preferred embodiment of the phoneme decoding system and method include a medium, a plurality of words disposed on the medium, and a plurality of phoneme symbols disposed on the medium. In preferred embodiments the medium comprises paper, for example, however in some embodiments, the medium comprises a "virtual medium," similar in respect to an encoded file that is human-perceivable with a word-processing, translation or other similar software program. A virtual medium can both be perceived on a screen as well as saved onto a computer-readable medium, such as a magnetic or electro-optical disc for example. The virtual medium can be further manipulated and will be further discussed below.

A plurality of words are disposed on the medium and each word has at least one letter string. A letter string is a textual or orthographic incarnation of a phoneme sound and includes 1 or more letters. For example, the word "nice" is comprised of three letter strings: "n", "i" and "ce". Each of these three letter strings has their own sound. As another non-limiting example, the word "motion" contains three letter strings: "m", "o" and "tion". Each of these three letter strings is representative of their own phoneme. A letter string should not be confused with a syllable. Some embodiments preferably include at least one substantially vertical line disposed on the medium and within a word to delineate syllables of the word. Other syllable delineation methods are contemplated. Furthermore, an emphasis mark can be included All letter strings are representative of either a single source phoneme or a multi-source phoneme. A single-source phoneme is a phoneme that is currently only represented by one letter string representation. In the English language, all single source phonemes are consonant sounds. Letter strings representing single source phonemes need not be accompanied by a phoneme symbol, because they can only be pronounced. All other letter strings can be representative of a plurality of phonemes dependent on usage. Such letter strings are patched with a superscripted (for example) phoneme symbol so that the reader understands what phoneme should be pronounced. Again, a phoneme is the sound, whereas the letter string is the grouping of letters attempting to textually communicate the sound. Multi-source phonemes include all other phonemes will be discussed below.

In preferred embodiments, symbols are placed above, for example, letter strings that are associated with or representative of multi-source phonemes. Preferred embodiments include phoneme symbols representative of multi-source vowel phonemes, multi-source consonant phonemes, and other phonemes. The letters in the letter string are not physically replaced; for example, the letters are not crossed-off with new letters written aside them. The term phoneme, as used herein, relates to abstract phoneme: a reader can look to the phoneme represented by a symbol if the reader is having trouble perceiving the phoneme from the letter string.

At least one phoneme symbol is utilized that represents a vowel phoneme. The phoneme symbol is disposed on the medium (e.g. paper, virtual, film, etc) in proximate location to a letter string representative of the plurality of vowel phoneme phonemes. This phoneme symbol is of a first symbol type and is exclusively associated with one of the vowel phonemes. Such exclusive association is bilateral, as there is one-to-one correspondence.

At least one phoneme symbol is utilized that represents a consonant phoneme and is disposed on the medium in proximate location to a letter string representative of one of a plurality of consonant phonemes. The consonant phoneme symbol is of a second symbol type (different from the first symbol type) and is exclusively associated with one of the consonant phonemes. Such exclusive association is bilateral, as there is one-to-one correspondence.

A symbol key preferably defines these exclusive associations. In some, but not all, embodiments of the present invention, the symbol key itself is included in the system. In some other embodiments, the symbol key is not included and user knowledge of the exclusive associations is presumed. The present invention is preferably an English phoneme decoding system, however one skilled in the art will appreciate that the present invention can be adapted to other suitable languages. In some embodiments, exclusive relationships are defined in accordance with standard American English, however in some embodiments, the exclusive relationships are defined in accordance with dialects, regional accents and/or cultural accents.

In embodiments utilizing a virtual medium, the virtual medium is at least temporarily stored on a computer-readable medium. A computer may be utilized comprising a processor, an at least temporary memory, a display, and an input device. Furthermore, computer-executable code is used for creating and altering letter strings, phoneme symbols, the virtual medium itself, and the symbol key itself. Embodiments of the phoneme decoding system include computer executable code for, in accordance with an alteration to the symbol key, automatically redefining the exclusive relationships and altering the disposition of the phoneme symbols accordingly. This is particularly useful for automatically converting text passages into text pages annotated with phoneme symbols and will be discussed below.

A phonetic reading system is also disclosed herein, comprising a set of phonetic phoneme symbols each symbol representative of a sound, said sounds consisting of sounds made during human speech, and said phonetic phoneme symbols representative of both vowel sounds and consonant sounds; and a medium having a word thereon, said word having a plurality of alphabet characters representing sounds made during human speech, said sounds made during human speech being one of a root sound, a phoneme sound and a silent sound.

In some embodiments, the phonetic phoneme symbols comprise a reading mark that is disposed on said medium above or below said alphabet characters representing a phoneme sound; the root sound is depicted on said medium within said word by the absence of said reading mark; the phoneme sound is depicted on said medium within said word by the disposition of said reading mark replacing said root sound of said alphabet character(s) with which said reading mark is associated; and said silent sound is depicted on said medium within said word by the disposition of said reading mark replacing said root sound of said alphabet character(s) with which said reading mark is associated. Depending on the embodiment, the medium can be video display, film display, vocalized and/or incorporated within a digital medium.

These and other features and objects of the invention will be more fully understood from the following detailed description of the preferred embodiments, which should be read in light of the accompanying drawings.

BRIEF DESCRIPTION OF THE DRAWINGS

The accompanying drawings, which are incorporated in and form a part of the specification, illustrate the embodiments of the present invention and, together with the description serve to explain the principles of the invention. In the drawings:

FIG. 4a is an embodiment of a classification page showing which phoneme are associated with each symbol type.

DETAILED DESCRIPTION OF THE INVENTION

In describing an embodiment of the invention illustrated in the drawings, specific terminology will be used for the sake of clarity. However, the invention is not intended to be limited to the specific terms so selected, and it is to be understood that each specific term includes all technical equivalents which operate in a similar manner to accomplish a similar purpose.

Reading can be characterized as a complex function of human intelligence. Humans learn to speak before learning to read and thus "hear" the words in the mind as the words are sounded out from the page. However, decoding is necessary to sound out the word. Moreover, in order to sound out words correctly humans need to have letter strings of alphabetic characters to tell us what the sounds of the word are. A human combines phonemes together to speak, write and read words. This is a form of encoding and decoding.

Over several viewings of a word, a human recognizes the connected sound symbols (letter strings) as a visual pattern. Consequently, the reference points in the brain are connected between sound (temporal lobe) centers and visual (visual cortex) centers and comprehension (frontal lobe) centers. In other words, a human recognizes and understand the "whole" word. The process of learning to read must commence sequentially from learning the letter strings symbolizing sounds, to learning how to combine the letter stings together, to learning to recognize the whole word as a visual pattern, to comprehending the word to, and to learning to write and spell the word. If reading is learned sequentially reading ability accelerates rapidly. If reading is learned out of neurological and phonological sequence, reading ability is stunted. Secondly, and unfortunately, the English language is flawed and teaching the sounds of English, while, without doubt, one of the most critical of components for learning to read, is also the most overlooked component to reading precisely because the written language has obscured the sounds of English within the written code itself as evidenced by the occurrences of multiple letters having multiple sounds associated with them on the order of 190+ irregular combinations that show up in everyday common words. This, in a nutshell, is one of the problems of learning to read English and the primary cause of reading difficulty and illiteracy in English speaking countries.

Compare this to Greek in which every letter has one, unique sound, a one to one correspondence between letter and sound. Greek is pure because it was created by the Greek scholars borrowing letters from the Phonoecian and adding to them as necessary to encode each sound of the Greek language. Also compare Spanish and Finnish. English borrowed the Greek (then Roman) alphabet, added over twenty new sounds and never updated the code! Rather than creating new symbols for the new sounds, the disorganized peoples and clans of ancient England, having virtually no systematic scholarship for more than a thousand years, allowed vowels and consonants to take on unlimited new pronunciations either standing alone or as part of a combination of letters. Completely unregulated and subject to continuous chaotic and dynamic forces such as power shifts in the military and political spectrum, English quickly got out of control.

Samuel Johnson finally attempted to bring the wayward tongue somewhat under control in 1755 by writing the first ever English dictionary to standardize the definition, spelling and pronunciation of English words. Noah Webster followed in Johnson's path and in 1783 published the "American Speller" and in 1828 published the first ever American English dictionary that we know today as Webster's. For all that both of these two great lexicographers did to standardize the language, they made no attempt to fix the underlying flaw that had grown into an incredible burden to learning to read English.

The present invention is the first of its kind effort to attempt to provide the symbols that have been missing from the language for nearly 2,000 years and is designed for maximum assimilation by students. Each symbol type is easily memorable by, for example, its pictogram. Embodiments of the invention include twenty-seven symbol types to phonetically interpret irregular English letter strings. Phoneme symbols, characterized as being one of these symbol types, are placed above the letter strings in a given word or sentence, for example. Students look at the phoneme symbol each time they come across an unfamiliar letter string. They pronounce the sound associated with the phoneme symbol and temporarily disregard the letter string. In this way they work through the "sounding out" process of reading the word.

Comprehension comes next. This is a function primarily of neural connectivity within the temporal lobe of the brain, and specifically between Wernicke's Area in the brain where sounds are heard, and speech centers in the brain where sounds are made (Broca's Area), and also areas of the frontal lobe where words are understood. Children first sound out words awkwardly, say the sounds to themselves one or two times silently or out loud, say them faster and more fluidly as necessary, and then wait for a period of between a few microseconds and a few seconds for the neural connections to be formed in the temporal and frontal lobes. At this time, readers experience the associated electrical and neuroendocrinal impulses of neural connectivity in the brain. This feeling is loosely vernacularized as an "Aha!" moment. Once the temporal lobe hearing and speaking centers are connected to the frontal lobe word comprehension centers, the student can progress to linking the visual cortex, but not before the critical temporal/frontal link has been completed. Embodiments of the present invention enhance temporo-frontal linking by ensuring that all the necessary sounds contained in the word are available to the student for decoding and interpreting.

Currently at least one, (by definition) and normally many letters in EVERY word of the English language have no obvious associated sound leaving the reader one of only two options, guess or ask! The present invention eliminates the guesswork so students can progress independently, rapidly, and have fewer questions, enabling teachers to provide direct one-on-one guidance as needed. Children can read by themselves in a matter of days.

Visual coding comes next. After continued viewing of words and letter strings, repeated electrical firings in the temporal lobe, and between the temporal lobe, frontal lobe and visual cortex, create neural pathways and facilitate neural encoding and recognition of words and memory of words as stand alone units. In other words after a human see a word a few times, the human doesn't need to sound it out any more. The same is true with certain regular and even irregular letter strings, e.g. "phone" but not "pone." Once visual, temporal and frontal recognition is completed, the reader "knows" a new word.

Spelling is a visual activity. The visual cortex is responsible for encoding the visual image of every word but this does not mean that humans can learn words as pictures without understanding them phonemically. In other words, humans continuously confirm while reading, in the temporal lobe and frontal lobes, what the visual lobe is identifying. For instance, a human sees the word "pepper" and then confirms the three "p's" and vowel sounds in the temporal lobe by initiating, however brief, a sound impulse in Wernicke's area, which is then confirmed in the frontal lobe. People who dwell on this sound impulse are slow readers who still sound out words or spend too much time confirming their words and sounds due to a variety of reasons. Fast readers confirm faster. All readers must confirm or they are not reading, are not decoding and comprehending. Confirming is a fundamental, completely learnable skill that is the core component of reading ability in all human beings.

Spelling is a recall event beginning in the temporal lobe (audio cortex, Wernicke's Area) moving to the visual cortex, moving back and forth as necessary between them and the frontal lobe and then ending in the temporal lobe (Broca's area) where the word muscle sequence neural firing pattern is triggered to sound the word in the mouth and vocal chords or in the motor cortex where the word writing sequence is activated. In other words, humans hear the word, humans see the word, humans try to identify the letter strings of the word in the visual cortex where they are stored as symbols, and humans then assemble/compile the letters and send out for confirmation that assembly will produce the correct sound that would be heard and say and that all this makes sense to our logic centers in the frontal lobe and potentially to other areas of the brain. Once we receive confirmation from all indicated areas, the motor cortex is triggered and humans may spell the word on paper or out loud.

Spelling, by definition, chronologically must follow word pattern recognition. Spelling memory is embedded throughout the reading process as a function of continuous back and forth neural activity between various lobes, but correct spelling must come after our ability to recall the entire word. Humans cannot possibly spell a word that we cannot recall visual imagery of. Spelling can be enhanced by repetitious exercise of the recall process (spelling B's, spelling tests). Spelling can also be enhanced by writing, but all writing is not equal.

Embodiments of the present invention provide a paradigm shifting tool for children to activate the frontal lobe by writing complete thoughts years sooner than they ever could have before, which may lead to levels of neural connectivity, complexity and neurotopological sophistication in the frontal lobe far greater than we have ever seen. One object of some embodiments of the present invention is to help children achieve reading skill equal to their speaking and listening skills as quickly as possible. Reading skills usually do not synch up with verbal skills until 7th, 8th or 9th grades. It is believed that reading skills can be synchronized with verbal skills as young as kindergarten or first grade. This is seven years sooner than average and allows for seven critical years of neural development of the brain's language centers in an environment of synchronized reading and verbal skills. When the student's writing centers in the brain are activated, and they too become synchronized with the reading and verbal centers, connectivity of all language processing neurons may increase exponentially. At this point, the linguistically empowered students become sophisticated comprehenders of literature and text, talented communicators; and the sky is the limit regarding how far and what type of information they wish to consume in their quest for answers and greater intelligence.

Embodiments of the present invention include special voice-to-text features and advantages. Program code can be used to convert passages of English text into corresponding passages of phonetic symbols (and/or single-source phonemes). In some embodiments, a phoneme dictionary discussed above or other information table, is referenced in electronic form to obtain the proper emphasis and syllable delineation. In this respect, a phoneme translation module, converts letter strings having one-to-many correspondence with actual phonemes to corresponding phonetic symbols having one-to-one correspondence with actual phonemes.

Figure 1A:
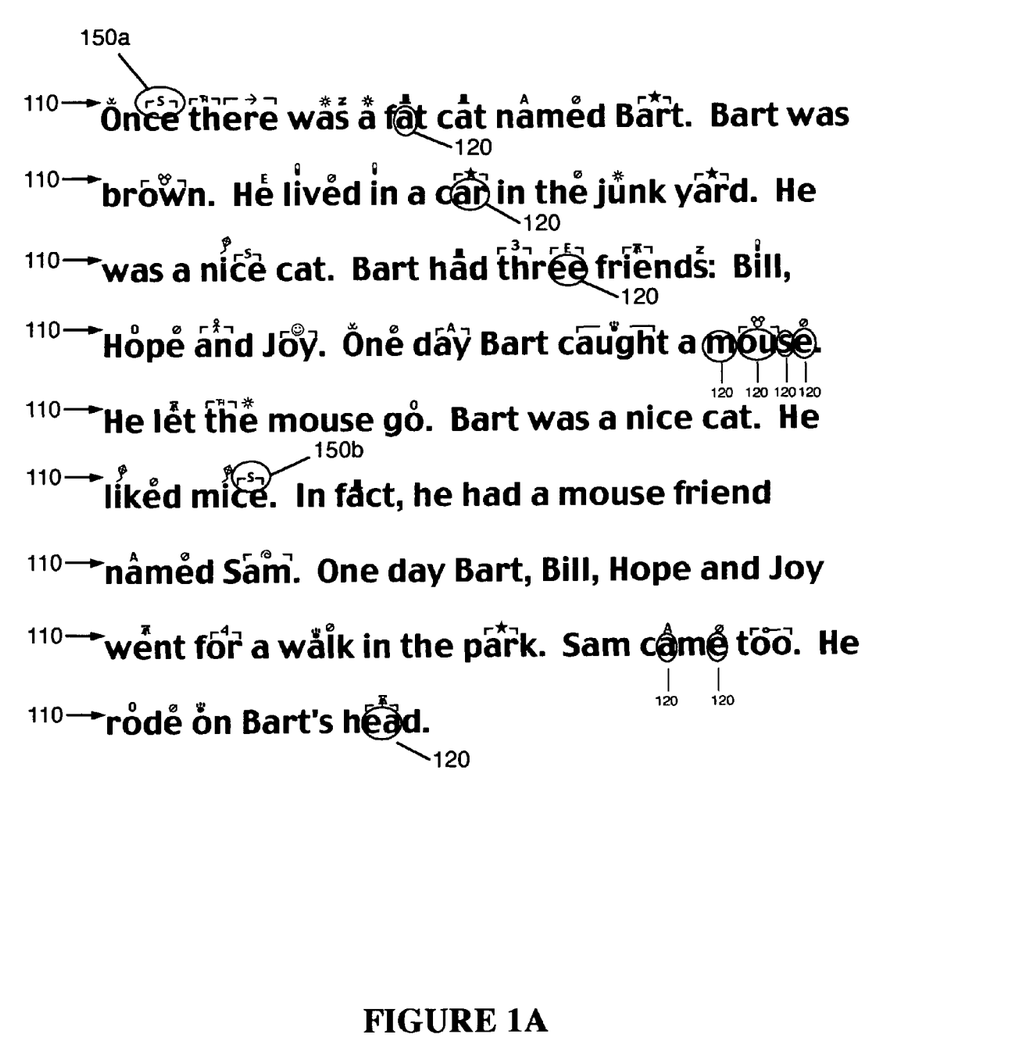
FIG. 1a is a sample passage of words showing embodiments of phoneme symbols positioned above corresponding letter strings.
Figure 1B:
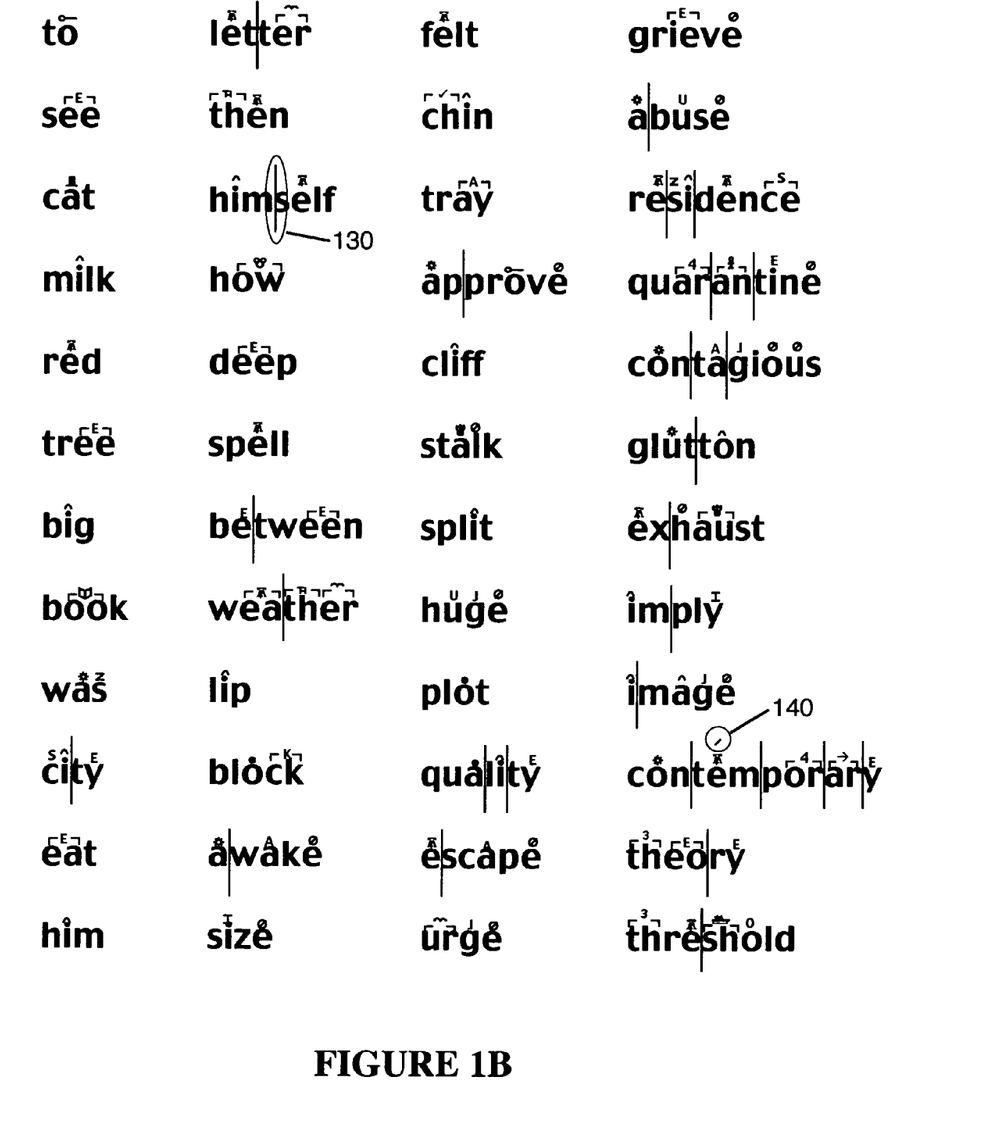
FIG. 1b is a sample passage of words showing embodiments of phoneme symbols, syllable delineators, and emphasis marks.
Figure 2:
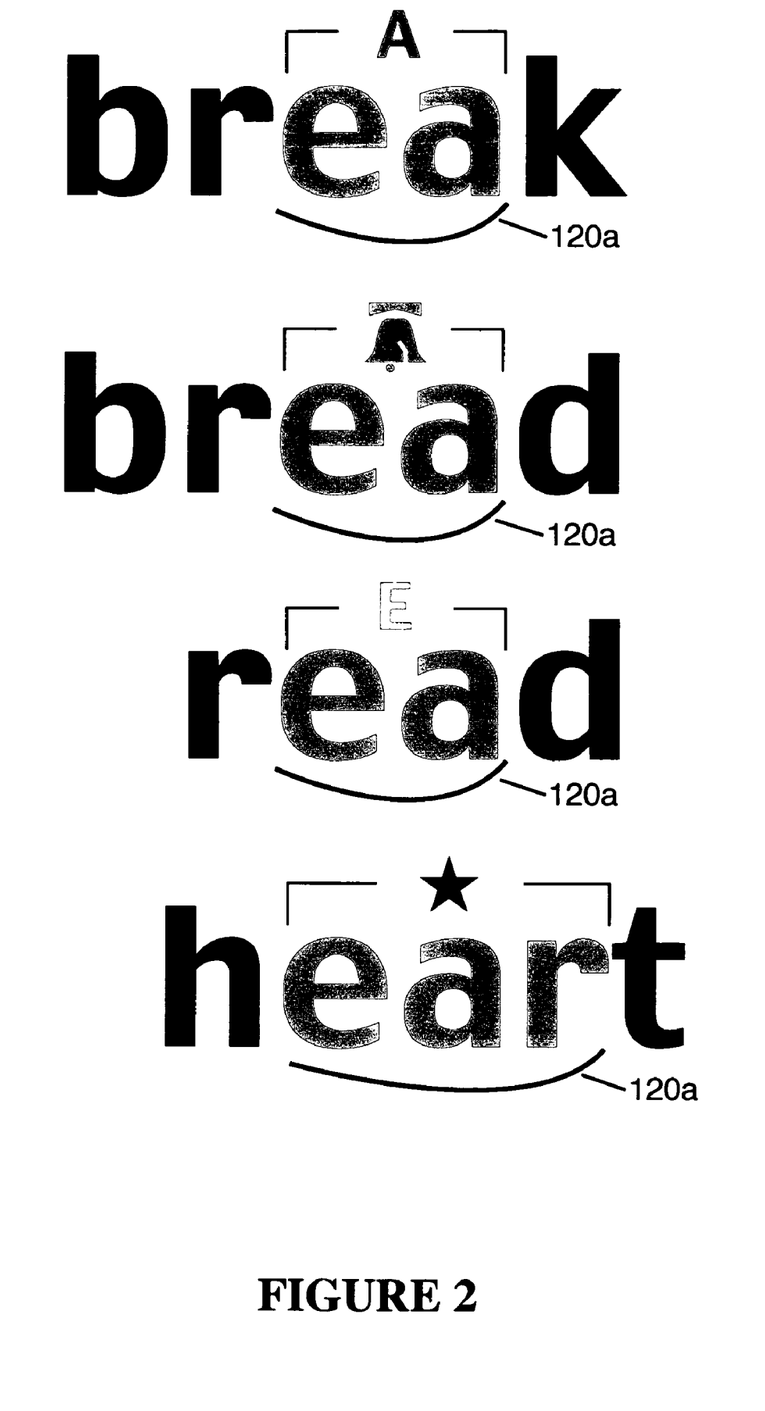
FIG. 2 is a textual illustration showing that a single letter string can be associated with a plurality of different phonemes.

With principal reference to FIGS. 1a, 1b and 2, words are shown with phoneme symbols 110 of various symbol types. The phoneme decoding system and method does not require the alteration of English words by the exchange of alphabetic characters with phonetic characters. Phoneme symbols 110 supplement the letter strings 120 as superscripted or superimposed set of reading marks. Additional reading marks may be added as a subscript below letter strings 120. Substantially vertical lines, referenced herein as syllable delineators 130 and shown in FIG. 1b, can be added between syllables within a given word without the necessity of altering the spacing between the alphabetic characters of that word. Emphasis marks 140 may be used to indicate emphasis of a syllable.

A comparison of phoneme symbols 150a ("S") and 150b ("S") is an example showing multiple instances (phoneme symbols 110) of the same symbol type 310. By contrast, a comparison of phoneme symbols 150a ("S") and 160 (" ☺ ") is an example showing phoneme symbols 110 of different, mutually exclusive symbol types.

Unlike the International Phonetic Alphabet, Cytanovich or Rai, embodiments of the invention are designed to accompany the English language text of a book or document for the purpose of providing proper sounding of all unknown words. In addition to education, some non-limiting examples of high-level applications include, business, medical, diplomatic, and other applications. Existing text can be supplemented by phoneme symbols in a way that patches the codes, or in other words, bridges the gap between the orthography and the pronunciation. In this way, when the orthographic code and the path are both present, readers can understand how to properly pronounce written letter strings so long as they either know the meaning of phoneme symbol 110 and/or if they already know how to pronounce the given word. Phoneme symbols 110 do not need to be conjugated with other written symbols or letters in order to be properly understood from the symbol key.

Due to elimination of the need to conjugate, the present invention minimizes the degree to which a reader will make an error in interpreting the phoneme to be pronounced. Furthermore, the present invention does not require the use of a monochrome or blackface appearance of text. The invention is comprised of a unique set of phonetic phoneme symbols all having a monochrome appearance. This facilitates compatibility with both color and monochrome printing presses and other mediums.

With principal reference to FIG. 2, a textual illustration is shown to emphasize that different instances of a letter string 120a can be associated with a plurality of different phonemes. This inherent ambiguity, however, is avoided by placement of a phoneme symbol 110 over the ambiguous letter string 120a. A symbol key identifies the phoneme associated with phoneme symbol 110.

Figure 3:
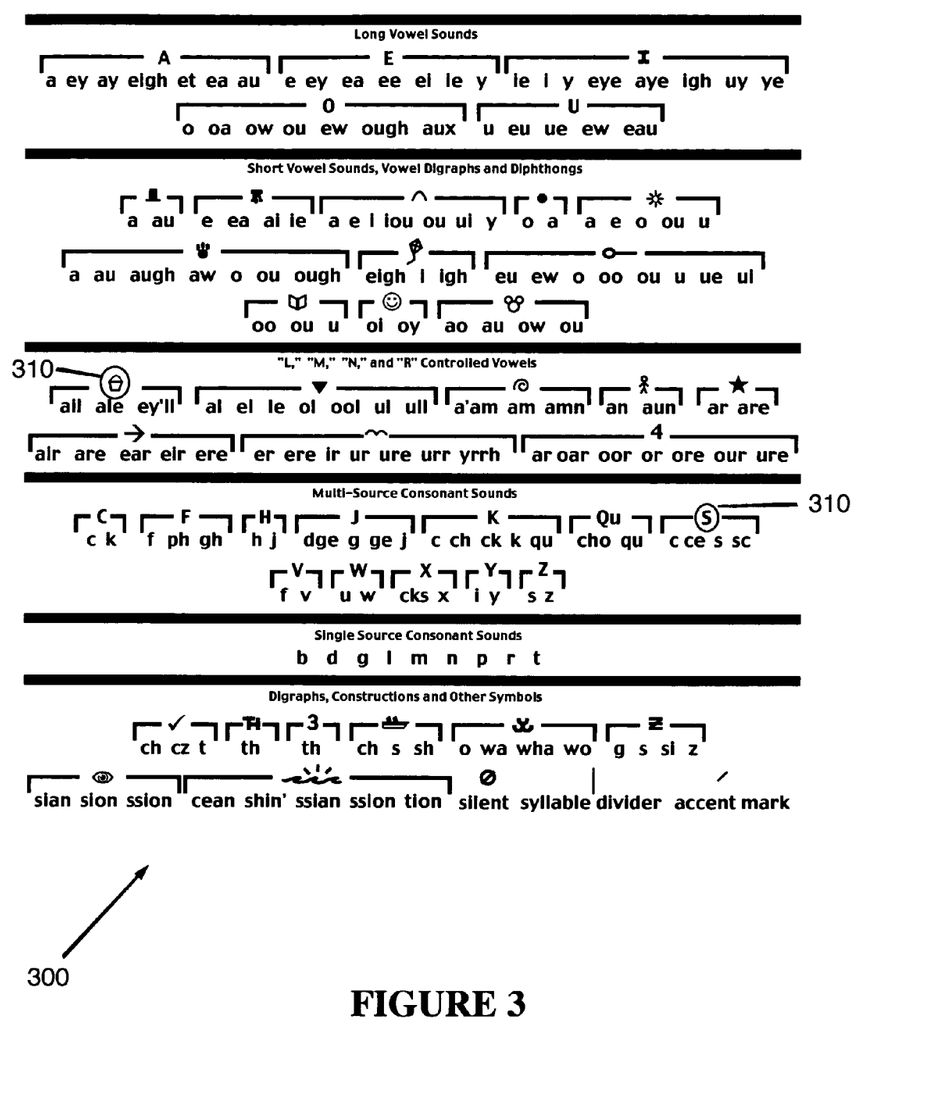
FIG. 3 is a classification page showing the letter strings that are associated with a common phoneme and symbol type.

With principal reference to FIG. 3, an embodiment of a symbol key is shown and designated generally 300 containing symbol types 310. Symbol key 300 includes a silent symbol type and fifty-three other symbol types 310. Silent symbol type is representative of silent phoneme and is preferably the symbol for null. Each of the other fifty-three symbol types 310 are representative of either long vowel sounds, short vowel sounds, vowel digraphs and diphthongs, "L", "M", "N" and "R" controlled vowels, multi-source consonant sounds, single-source consonant sounds, digraphs, constructions and other symbols.

In preferred embodiments, symbol type 310 (from which phoneme symbol 110 is chosen) is logically and/or cognitively related to the phoneme it represents by having alphabetic or pictogram related to the associated phoneme. As a non-limiting example, in the word "claw", the "aw" sound is represented by a small picture of a paw. As another non-limiting example, in the word "shell", the "sh" sound is always represented by a small picture of a ship.

Embodiments of symbol key 200 provides a unique phonetic code ready for every word in the English language (and any foreign language) and is flexible enough to be modified for differing regional and cultural accents. For example, another embodiment of symbol key 200 can be applied to a text passage containing letter strings 120 that are articulated in French. The phoneme decoding system is flexible enough to allow for the creation of new symbol types 310. As another non-limiting example, symbol key 200 for a British differs slightly from the American version with respect to the symbol types 220 chosen and the disposition of phoneme symbols 110. Indian English will differ from South African English; Bostonian English will differ from Mississippian English; and Ebonics will differ from Yiddish. These differences can be embodied in various symbol keys 200 by associating different phonemes with symbol types 220 and phoneme symbols 110 in accordance with usages particular to the subject language, dialect and/or accent.

Figure 4B:
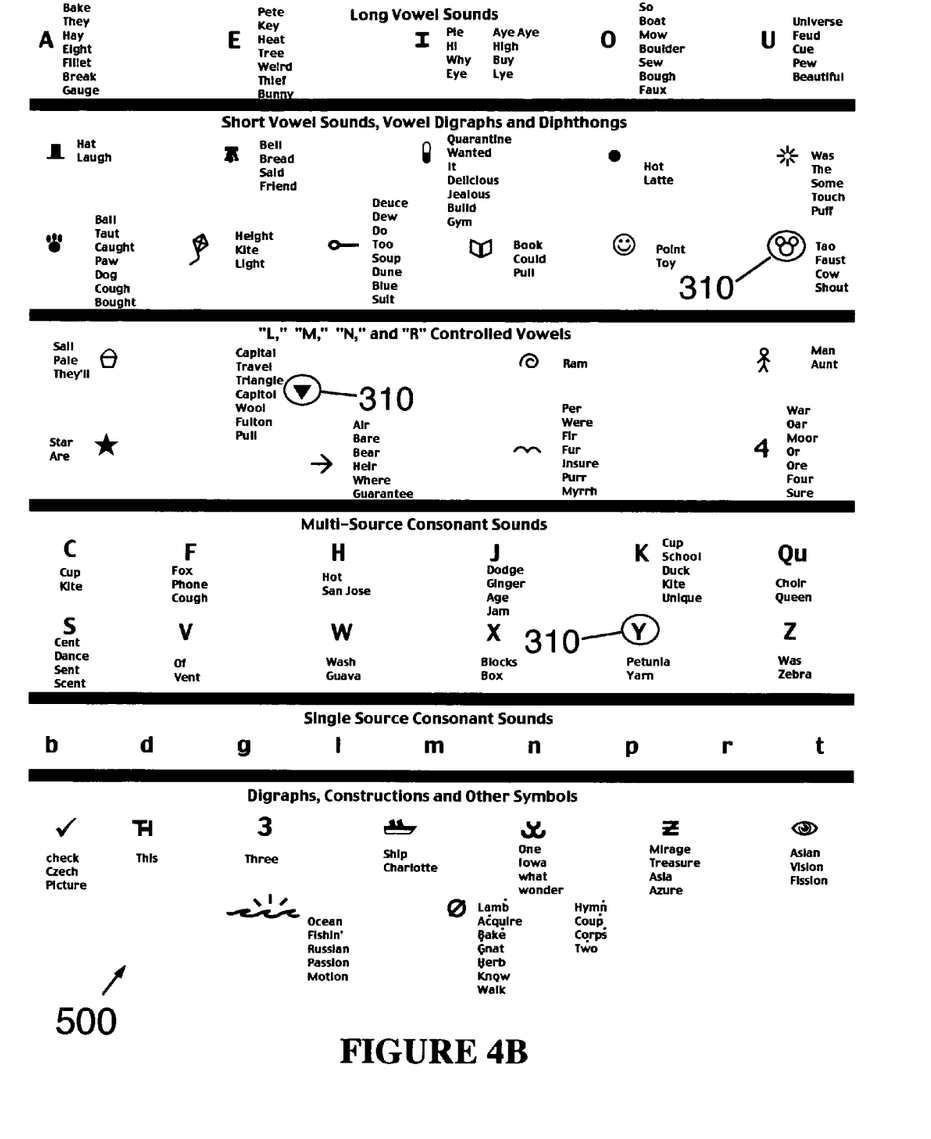
FIG. 4b is an embodiment of a classification page showing sample words that incorporate a phoneme associated with a certain symbol type.

With reference to FIGS. 3, 4 and 4b, additional embodiments of symbol key 300 are shown as symbol key 400a and symbol key 500. There are approximately one-hundred-eighty letter strings in the English language that represent the fifty-four phonemes (including the silent sound). However, the English alphabet only contains twenty-six letters. As shown, all fifty-four phonemes are reductively codified and represented by fifty-four symbol types 220. Phoneme symbols 110 are chosen from these fifty-four symbol types 220 for appropriate placement over letter strings 120. The fifty-four symbol types 220 shown were chosen because, among other reasons, the particular alphabetic or pictogram representation enhances the ability to learn. While such scrutiny of choice is preferable, symbol types 220 can be arbitrarily selected so long as mutual exclusivity is maintained. Of the fifty-four symbol types, nine are associated with single-source letters, twelve are associated with multi-source consonant sounds, and thirty-three are associated with multi-source vowel sounds or other sounds. Again, there is an absence of unanimous consensus among academics as to how many phonemes there are. The present invention contemplates any number of phonemes so long as a one-to-cone correspondence is established between phonemes and phoneme symbols 110.

With principal reference to FIG. 4a, another embodiment of a symbol key is shown and designated generally 400a. The nine single-source phonemes are shown. Each of the single-source letters is a root phoneme. In the English language, each of these root phonemes can be pronounced only one way and any confusion experienced by a reader is negligible. For this reason, preferred embodiments of the phoneme decoding system do not need to include any positioning of phoneme symbols 110 over letter strings 120 embodying a root phoneme.

Twelve multi-source consonant sounds are shown. Each of the multiple-source consonant phonemes are shown with the potential letter strings 120 that could be associated with the particular multi-source consonant phoneme. Each of the twelve multi-source consonant phonemes are associated with mutually exclusive symbol types. The sound is a codified consonant sound that can be represented by more than one letter string.

With principle reference to FIGS. 3, 4a and 4b, the remaining thirty-three sounds are also shown and described. These sounds include multi-source vowel sounds (vowel sounds derived from various letters or combinations of letters), multi-source digraphs (combinations of consonants or vowel that create a single new sound) multi-source diphthongs (combination of vowel sounds where one sounds blends to another and that can be represented by either vowels or consonants and by either a single letter or a combination of letters). These thirty-three sounds are collectively referenced herein as vowel phonemes.

In some embodiments of the present invention, a symbol key comprises a wall-chart learning tool such as the sample shown in FIG. 6. This can also be used at the home to reinforce one's memory of symbol key 200. Furthermore, phoneme symbols 110 can be incorporated as part of a flash card game helping children to build words by sounding them out using the visual phonemes of phoneme symbols. In this manner phoneme symbols 210 can be applied to teach and learn the English language through a number of game oriented educational tools. In some embodiments of the present invention, symbol key 200 can also be used as a tool that teachers can refer students to for the students to increase familiarity with the phonemes associated with a given symbol. This curriculum can be incorporated into any digital, multimedia, and/or transmitted format for computer and/or Internet usage. It can also serve as the core of a reading program.

Furthermore, in some embodiments, the present invention is incorporated into educational toys, games and/or learning tools, such as by way of non-limiting example, in an electronic console-based quiz game or reading application. Embodiments of the present invention can be added to the existing phonics and reading texts by adding the phoneme symbols based on the method and system disclosed herein. Digital text can also be altered through the population of any digital text with the phoneme symbols. This can be accomplished using computer-executable code.

In some embodiments, the phoneme decoding system and method utilizes a virtual medium for computer-based applications. In most cases, the virtual medium is a file, word-processing document, or other medium that is human-perceivable with the aid of computer, but is in digital (or analog) format. In most cases, the virtual medium (e.g. file) is saved on a computer-readable medium.

In some embodiments, the system and method utilize a computer. The computer can include a processor, an at least temporary memory, a display, and an input device. Other computer hardware can be utilized depending on the task at hand, such as scanners, guided and unguided signal transceivers (e.g. modem, LAN connection, wireless Internet communication device, cellular devices, WIFI-enabled devices, etc.), and other hardware. Computer-executable code can be used to create the first instances of symbol keys 200 passage and/or words having letter strings 120. Computer-executable code can also be utilized to identify the appropriate phoneme symbols 110 and appropriately position the appropriate phoneme symbols 110. This is based at least in part on (1) what phoneme is associated with each letter string, and (2) what symbol key is being used (e.g. American standard, New England, London, etc.)

Computer-executable code can also be used in a subsequent instance to alter the phonetic identity and/or position of the phoneme symbols. Such application is particularly useful for readers that are familiar with or are studying two different accents, dialects (or even languages). By scrutinizing a first medium populated by a first symbol key and then scrutinizing the same or another medium populated by a second symbol key, a reader can manually identify where the distinctions are between two different accents, dialects or languages. Some embodiments of the computer-executable code can include a "compare" feature to automatically identify the linguistic differences in a passage based on two or more different symbol keys.

Some embodiments of the present invention comprise a phoneme dictionary, said phoneme dictionary comprising a medium with certain information disposed thereon. Some embodiments of the dictionary are phonologically organized writer's dictionary for the English language. The dictionary is alphabetized (rather "phona-bet"-ized) according to the fifty-three, for example, symbol types. The particular order of the phonebetization can be arbitrarily selected, just as alphabetization is arbitrary. Consistency is the important feature. One phonabetized, the order of the phonabets should remain the same. To look up a word, a reader can sound the word, identify the symbols types associated with sounded phoneme(s), and then look up the word phonabetically. Upon discovering the word, there may be several homophones (words that sound the same but are spelled differently) listed at the same location. Each homophone has its definition and its alphabetic spelling. The writer can choose the proper word. In this way, children can look up any word as necessary to write provided they choose the correct sound symbols.

As an example, a five or six year old may choose "ch," "r," "ee" for the word tree. This is an example of where a teacher will demonstrate that the first sound is actually "t," not "ch." In this way the child increases phonemic awareness throughout the writing process. Children are encouraged to write with phoneme symbols first and to fill in the irregular letters strings later as part of a more analytical process. By having all the sounds at their disposal children can write fluidly, improve rapidly, build neural connections in the more sophisticated thought centers of the brain associated with idea construction (many of which reside in the right hemisphere and particularly the right frontal lobe).

The present invention includes a system, a method, an article of manufacture, a computer-readable medium, a human-readable medium, a virtual medium, a method of reading, a phoneme dictionary, and other subject-matter.

Although there has been hereinabove described a phoneme decoding system and method, in accordance with the present invention and for the purposes of illustrating the manner in which the invention may be used to advantage, it should be appreciated that the invention is not limited thereto. Accordingly, any and all modifications, variations, or equivalent arrangements, which may occur to one skilled in the art should be considered to be within the scope of the present invention as defined in the appended claims.

What is claimed is:

1. A phoneme decoding system, comprising:
a non-transitory medium;
one or more sentences disposed on the medium, each sentence comprising one or more words, each of the words comprising at least one letter string representative of at least one of a single-source phoneme, a silent phoneme, and a multi-source phoneme; and
a symbol key defining a unique mnemonic pictogram for every multi-source phoneme of the system;
wherein at least one word comprises a multi-source phoneme letter string with a unique pictogram positioned thereabove or therebelow that represents the phoneme for the given usage of the underlying letter string in the word and in the sentence, and that is the only pictogram for all letter strings associated with said phoneme; all of the letter strings disposed on said medium form all or part of said one or more words disposed on said medium; and all of the pictograms are positioned above or below the letter strings they represent.

2. The phoneme decoding system of claim 1, comprising an English phoneme decoding system.

3. The phoneme decoding system of claim 1, wherein the symbol key defines the exclusive representations in accordance with standard American English.

4. The phoneme decoding system of claim 1, wherein the symbol key defines the exclusive representations in accordance with at least one of a dialect, a regional accent and a cultural accent.

5. The phoneme decoding system of claim 1, wherein each letter string comprises a single vowel or consonant.

6. The phoneme decoding system of claim 1, wherein each letter string comprises a plurality of vowels or a plurality of consonants.

7. The phoneme decoding system of claim 1, wherein the non-transitory medium comprises paper.

8. The phoneme decoding system of claim 1, wherein the non-transitory medium comprises one of an electronic display and film.

9. The phoneme decoding system of claim 1, comprising computer-executable code for creating at least one of said letter strings, said pictograms, the medium, and the symbol key.

10. The phoneme decoding system of claim 1, comprising computer-executable code for altering at least one of said letter strings, said pictograms, the medium, and the symbol key.

11. The phoneme decoding system of claim 1, comprising computer executable code for, in accordance with the symbol key, automatically defining the exclusive relationships and altering the disposition of the pictograms accordingly.

12. The phoneme decoding system of claim 1, comprising computer executable code for, in accordance with an alteration to the symbol key, automatically redefining the exclusive relationships and altering the disposition of the pictograms accordingly.

13. The phoneme decoding system of claim 1, comprising at least one substantially vertical line disposed on the medium and within a word to delineate syllables of the word.

14. The phoneme decoding system of claim 1, comprising a monochrome phoneme decoding system.

15. The phoneme decoding system of claim 1, further comprising a symbol key comprising pictograms for the pronunciation of a plurality of single-source and multi-source phonemes of the English language and a pictogram for said silent phoneme.

16. The phoneme decoding system of claim 15, wherein said symbol key comprises pictograms for the pronunciation of all the single-source and multi-source phonemes of the English language.

17. The phoneme decoding system of claim 16, wherein said pictograms are cognitively related to the phoneme it represents.

18. The phoneme decoding system of claim 1, comprising additional reading marks placed as a subscript below at least one of said letter strings.

* * * * *